United States Patent
Hatanaka et al.

(10) Patent No.: US 10,329,984 B2
(45) Date of Patent: Jun. 25, 2019

(54) OXYGEN STORAGE/RELEASE MATERIAL

(71) Applicant: KABUSHIKI KAISHA TOYOTA CHUO KENKYUSHO, Nagakute-shi, Aichi (JP)

(72) Inventors: Miho Hatanaka, Nagakute (JP); Akihiko Suda, Nagakute (JP)

(73) Assignee: KABUSHIKI KAISHA TOYOTA CHUO KENKYUSHO, Aichi (JP)

( * ) Notice: Subject to any disclaimer, the term of this patent is extended or adjusted under 35 U.S.C. 154(b) by 0 days.

(21) Appl. No.: 15/911,947

(22) Filed: Mar. 5, 2018

(65) Prior Publication Data
US 2018/0252139 A1    Sep. 6, 2018

(30) Foreign Application Priority Data

Mar. 2, 2017 (JP) ................. 2017-039381

(51) Int. Cl.
| | |
|---|---|
| B01J 23/10 | (2006.01) |
| B01J 21/06 | (2006.01) |
| F01N 3/28 | (2006.01) |
| B01J 37/02 | (2006.01) |
| B01D 53/94 | (2006.01) |
| B01J 37/08 | (2006.01) |
| F01N 3/20 | (2006.01) |

(Continued)

(52) U.S. Cl.
CPC ......... *F01N 3/2803* (2013.01); *B01D 53/945* (2013.01); *B01J 21/066* (2013.01); *B01J 35/0006* (2013.01); *B01J 37/0234* (2013.01); *B01J 37/0248* (2013.01); *B01J 37/084* (2013.01); *F01N 3/0814* (2013.01); *F01N 3/0864* (2013.01); *F01N 3/2013* (2013.01); *B01D 2255/2061* (2013.01); *B01D 2255/2063* (2013.01); *B01D 2255/2066* (2013.01); *B01D 2255/2068* (2013.01); *B01D 2255/407* (2013.01); *B01D 2255/908* (2013.01); *B01D 2255/9205* (2013.01); *F01N 2370/02* (2013.01); *F01N 2570/16* (2013.01)

(58) Field of Classification Search
CPC .................... B01J 23/10; B01J 21/066
See application file for complete search history.

(56) References Cited

U.S. PATENT DOCUMENTS

| | | | | |
|---|---|---|---|---|
| 5,137,862 A | * | 8/1992 | Mackrodt | ............... B01J 23/10 502/302 |
| 7,214,643 B2 | * | 5/2007 | Yamamoto | ............. C01G 25/00 423/592.1 |

(Continued)

FOREIGN PATENT DOCUMENTS

JP    2014-057904 A    4/2014

*Primary Examiner* — Cam N. Nguyen
(74) *Attorney, Agent, or Firm* — Oliff PLC (57) ABSTRACT

An oxygen storage/release material includes: a ceria-zirconia composite oxide porous body that has at least one ordered phase of a pyrochlore phase and a κ phase, and that has a central pore diameter of 70 nm to 1 μm as measured by a mercury penetration method, and in which a cumulative pore volume of pores that each have a pore diameter in the range of 0.5 times to 2 times the central pore diameter is 40% or more of the cumulative pore volume of pores that each have a pore diameter in the range of 10 nm to 10 μm as measured by the mercury penetration method.

8 Claims, 4 Drawing Sheets

(51) Int. Cl.
  *B01J 35/00* (2006.01)
  *F01N 3/08* (2006.01)

(56) References Cited

U.S. PATENT DOCUMENTS

| | | | | |
|---|---|---|---|---|
| 7,247,597 | B2* | 7/2007 | Morikawa | B01J 23/10 |
| | | | | 423/594.12 |
| 7,919,429 | B2* | 4/2011 | Okamoto | B01D 53/945 |
| | | | | 502/302 |
| 8,187,995 | B2* | 5/2012 | Wakita | B01D 53/945 |
| | | | | 423/593.1 |
| 8,202,819 | B2* | 6/2012 | Kohara | B01D 53/9468 |
| | | | | 502/304 |
| 8,337,791 | B2* | 12/2012 | Kohara | B01D 53/945 |
| | | | | 423/213.2 |
| 9,308,516 | B2* | 4/2016 | Houshito | B01J 23/63 |
| 9,707,543 | B2* | 7/2017 | Asanuma | B01J 23/63 |
| 9,931,614 | B2* | 4/2018 | Morikawa | B01J 23/10 |
| 9,962,684 | B2* | 5/2018 | Hayashida | B01J 23/10 |
| 10,065,179 | B2* | 9/2018 | Morikawa | B01D 53/94 |
| 2015/0209760 | A1 | 7/2015 | Asanuma et al. | |
| 2015/0375202 | A1* | 12/2015 | Nagao | B01J 21/066 |
| | | | | 502/304 |
| 2017/0028384 | A1* | 2/2017 | Murota | C01G 25/00 |
| 2018/0250657 | A1* | 9/2018 | Morikawa | B01D 53/94 |

\* cited by examiner

OXYGEN STORAGE/RELEASE MATERIAL

BACKGROUND OF THE INVENTION

Field of the Invention

The present invention relates to an oxygen storage/release material, and more particularly to an oxygen storage/release material including a ceria-zirconia composite oxide.

Related Background Art

Gases emitted from internal combustion engines such as automotive engines contain NOx and unburned components of the fuel. To efficiently remove these components, it is important to keep the atmosphere stoichiometric. To maintain such a stoichiometric atmosphere, ceria-zirconia composite oxides, which are capable of storing and releasing oxygen, have conventionally been used.

For example, Japanese Patent Application Publication No. 2014-57904 (Patent Literature 1) discloses a promoter (OSC material) for a catalyst for purification of exhaust gas, the promoter containing a ceria-zirconia composite oxide which has a pyrochlore phase and which has a peak in a region of a pore diameter of 100 nm or less in a log differential pore volume distribution. In particular, Examples of Patent Literature 1 describe a catalyst for purification of exhaust gas which contains a ceria-zirconia composite oxide having a peak in a pore diameter of 26 to 40 nm in a log differential pore volume distribution and which has a large amount of oxygen stored or released.

SUMMARY OF THE INVENTION

However, although having a large amount of oxygen stored or released, the conventional ceria-zirconia composite oxide having an ordered phase does not necessarily have a sufficiently high oxygen release rate, and does not necessarily have satisfactory response to changes in exhaust gas flow rate and temperature.

The present invention has been made in view of the problems of the above-described conventional technique, and has an object to provide an oxygen storage/release material that exhibits excellent oxygen release rate and a catalyst for purification of exhaust gas containing the same.

The present inventors have earnestly studied in order to achieve the above-described object. As a result, the present inventors found out that an oxygen storage/release material including a ceria-zirconia composite oxide porous body that has an ordered phase (a pyrochlore phase, a κ phase), and that has a central pore diameter of 70 nm to 1 μm, and in which pores near the central pore diameter account for 40% or more of all pores in a cumulative pore volume distribution, exhibits excellent oxygen utilization efficiency of $CeO_2$ and oxygen release rate. This finding has led to the completion of the present invention.

Specifically, an oxygen storage/release material of the present invention includes: a ceria-zirconia composite oxide porous body that has at least one ordered phase of a pyrochlore phase and a κ phase, and that has a central pore diameter of 70 nm to 1 μm as measured by a mercury penetration method, and in which a cumulative pore volume of pores (the above-mentioned "pores near the central pore diameter") that each have a pore diameter in the range of 0.5 times to 2 times the central pore diameter is 40% or more of the cumulative pore volume of pores (the above-mentioned "all pores") that each have a pore diameter in the range of 10 nm to 10 μm as measured by the mercury penetration method.

In such oxygen storage/release material of the present invention, it is preferable that in an X-ray diffraction pattern of the ceria-zirconia composite oxide porous body obtained by an X-ray diffraction measurement using CuKα, a ratio ($I_{ord}/I_{max}$) between a intensity $I_{ord}$ of a peak derived from the ordered phase in a region of 2θ=14 to 15 deg and a intensity $I_{max}$ of a maximum peak in a region of 2θ=29 to 30 deg be 0.03 or more. In addition, it is preferable that a content molar ratio of Ce and Zr in the ceria-zirconia composite oxide porous body be Ce:Zr=40:60 to 60:40.

In addition, in the oxygen storage/release material of the present invention, the ceria-zirconia composite oxide porous body preferably further comprises at least one additional element selected from the group consisting of Y and lanthanoides excluding Ce, and the additional element is more preferably at least one selected from the group consisting of La, Pr, Nd and Y. Moreover, a content molar ratios of Ce, Zr and the additional element in the ceria-zirconia composite oxide porous body are preferably $0.667 \leq Ce/Zr \leq 1.5$ and $0.667 \leq (Ce+M)/Zr \leq 1.5$ (in the formula, M represents the additional element).

In addition, a catalyst for purification of exhaust gas of the present invention includes such an oxygen storage/release material.

Note that it is not necessarily certain why the oxygen storage/release material of the present invention exhibits an excellent oxygen release rate. The present inventors have surmised as follows. Specifically, the oxygen storage/release material of the present invention includes a porous body of a ceria-zirconia composite oxide having at least one ordered phase of the pyrochlore phase and the κ phase. The pyrochlore phase ($Ce_2Zr_2O_7$) of such a ceria-zirconia composite oxide undergoes phase change to and from the κ phase ($Ce_2Zr_2O_8$) in accordance with changes in oxidation-reduction atmosphere in the gas phase and exhibits the oxygen storage/release performance. The oxygen storage/release performance exhibited by such phase changes between the pyrochlore phase and the κ phase has a very high oxygen utilization efficiency of $CeO_2$ as compared with the oxygen storage/release performance exhibited by a fluorite phase, and reaches substantially the theoretical value of the amount of oxygen stored and released (OSC: Oxygen Storage Capacity). In addition, since the oxygen storage/release material of the present invention has a structural feature that the central pore diameter and a ratio (pore volume concentration ratio) of the cumulative pore volume of the pores near the above-described central pore diameter to the cumulative pore volume of all pores have appropriate values, it can be assumed that diffusion of gas changing the oxidation-reduction atmosphere in the pores and oxygen from the oxygen storage/release material of the present invention are facilitated. Accordingly, it can be assumed that the oxygen storage/release material of the present invention including the porous body of the ceria-zirconia composite oxide that has the ordered phase and a pore structure exhibits excellent oxygen utilization efficiency of $CeO_2$ and oxygen release rate.

According to the present invention, it is possible to obtain an oxygen storage/release material that has a high oxygen utilization efficiency of $CeO_2$ and exhibits an excellent oxygen release rate, and a catalyst for purification of exhaust gas including the same.

DETAILED DESCRIPTION OF THE PREFERRED EMBODIMENTS

Hereinafter, the present invention is described in detail with reference to preferred embodiments thereof.

First, an oxygen storage/release material of the present invention is described. The oxygen storage/release material of the present invention includes a ceria-zirconia composite oxide porous body that has at least one ordered phase of a pyrochlore phase and a κ phase, and that has a central pore diameter of 70 nm to 1 μm as measured by a mercury penetration method, and in which a cumulative pore volume of pores that each have a pore diameter in the range of 0.5 times to 2 times the central pore diameter (hereinafter, referred to as "pores near the central pore diameter") is 40% or more of the cumulative pore volume of pores that each have a pore diameter in the range of 10 nm to 10 μm as measured by the mercury penetration method (hereinafter, referred to as "all pores"). Such an oxygen storage/release material exhibits excellent oxygen utilization efficiency of $CeO_2$ and oxygen release rate (OSC-r).

The ceria-zirconia composite oxide porous body according to the present invention has at least one ordered phase of the pyrochlore phase ($Ce_2Zr_2O_7$) and the κ phase ($Ce_2Zr_2O_8$) in each of which Ce and Zr are orderly arranged. The oxygen storage/release material having such an ordered phase exhibits excellent oxygen utilization efficiency of $CeO_2$ and oxygen release rate (OSC-r). Note that the presence of the ordered phase in a ceria-zirconia composite oxide porous body can be observed from the presence of a peak in a region of 2θ=14 to 15 deg in an X-ray diffraction pattern obtained by X-ray diffraction measurement using CuKα.

In such a ceria-zirconia composite oxide porous body, a ratio ($I_{ord}/I_{max}$) between the intensity $I_{ord}$ of a peak derived from the ordered phase in a region of 2θ=14 to 15 deg and the intensity $I_{max}$ of the maximum peak in a region of 2θ=29 to 30 deg in an X-ray diffraction pattern obtained by X-ray diffraction measurement using CuKα is preferably 0.03 or more, and more preferably 0.04 or more. If the $I_{ord}/I_{max}$ is less than the lower limit, the proportion of the ordered phase in the crystal phase of the ceria-zirconia composite oxide porous body is low, and the oxygen utilization efficiency of $CeO_2$ tends to decrease.

Note that in the X-ray diffraction pattern of the ceria-zirconia composite oxide porous body, the peak in the region of 2θ=14 to 15 deg is a diffraction peak derived from the (111) plane of the ordered phase (the pyrochlore phase, the κ phase), and the peak in the region of 2θ=29 to 30 deg is a maximum peak where a diffraction peak derived from the (222) plane of the ordered phase and a diffraction peak derived from the (111) plane of a cubic phase overlap each other. Accordingly, the intensity ratio ($I_{ord}/I_{max}$) between the peak in the region of 2θ=14 to 15 deg and the maximum peak in the region of 2θ=29 to 30 deg serves as an indicator indicating the ratio of presence of the ordered phase in the ceria-zirconia composite oxide porous body.

In addition, the ceria-zirconia composite oxide porous body according to the present invention has a central pore diameter of 70 nm to 1 μm. The oxygen storage/release material having such a central pore diameter exhibits excellent oxygen release rate (OSC-r). If the central pore diameter is less than the lower limit, the diffusion resistance of molecules in the pores becomes large, and thus the oxygen release rate (OSC-r) tends to decrease. If the central pore diameter exceeds the upper limit, collision of molecules against each other (diffusion of molecules) becomes dominant, and thus the oxygen release rate (OSC-r) tends to decrease. In addition, an effective porous region exists depending on the operating temperature. There is a tendency that at a low temperature (for example, 400° C.), the central pore diameter is preferably 70 to 500 nm while at a high temperature (for example, 600° C.), the central pore diameter is preferably 100 nm to 1 μm, and more preferably 200 nm to 1 μm.

Note that the term "central pore diameter" in the present invention means a pore diameter at the maximum peak in a region of 10 μm or less in a curve (log differential pore volume distribution curve) obtained by plotting values (log differential pore volume (dV/d(log D))), which are obtained by differentiating a pore volume (V) as measured by the mercury penetration method with a logarithmic value (log D) of a pore diameter (D), to the pore diameter (D).

Moreover, in the ceria-zirconia composite oxide porous body according to the present invention, the ratio (hereinafter, referred to as a "pore volume concentration ratio") of the cumulative pore volume of pores (pores near the central pore diameter) that each have a pore diameter in the range of 0.5 times to 2 times the central pore diameter (0.5 Dc to 2 Dc, Dc: central pore diameter) to the cumulative pore volume of pores (all pores) that each have a pore diameter in the range of 10 nm to 10 μm as measured by the mercury penetration method is 40% or more. If the pore volume concentration ratio is less than the lower limit, the tendency between the central pore diameter and the oxygen release rate (OSC-r) (i.e. the temperature dependence of the oxygen release rate by the central pore diameter) is significantly unlikely to appear.

Note that the cumulative pore volume indicates a value obtained by integrating pore volumes in the predetermined pore diameter range (10 nm to 10 μm, or 0.5 times to 2 times the central pore diameter Dc (0.5 Dc to 2 Dc)) based on the log differential pore volume distribution curve measured by the mercury penetration method.

In the ceria-zirconia composite oxide porous body according to the present invention, the content molar ratio between Ce and Zr is preferably Ce:Zr=40:60 to 60:40, and more preferably 45:55 to 55:45. If the content molar ratio between Ce and Zr is out of the above-described range, the intensity ratio ($I_{ord}/I_{max}$) of the X-ray diffraction peaks, which is an indicator for the ratio of presence of the ordered phase, tends to decrease. In addition, the ceria-zirconia composite oxide porous body according to the present invention is preferably in the form of a solid solution.

In addition, at least one additional element selected from the group consisting of Y and lanthanoides excluding Ce is preferably further contained in the ceria-zirconia composite oxide porous body according to the present invention. Thereby, the oxygen storage/release material of the present invention exhibits excellent heat resistance. Furthermore, from the viewpoint that the heat resistance of the oxygen storage/release material is further improved, the preferable additional elements include La, Pr, Nd and Y. Moreover, of such an additional element, the lanthanoide preferably solid-dissolves in a Ce site and Y preferably solid-dissolves in a Zr site.

In such a ceria-zirconia composite oxide porous body containing the additional element, a content molar ratios of Ce, Zr and the additional element are preferably $0.667 \leq Ce/Zr \leq 1.5$ and $0.667 \leq (Ce+M)/Zr \leq 1.5$ (in the formula, M represents the additional element. The same shall apply hereinafter), and more preferably $0.818 \leq Ce/Zr \leq 1.222$ and $0.818 \leq (Ce+M)/Zr \leq 1.222$. In particular, in case where the ceria-zirconia composite oxide porous body contains Y, the content molar ratios are preferably $0.667 \leq Ce/Zr \leq 1.5$ and $0.667 \leq (Ce+lanthanoide (excluding Ce)+Y/2)/(Zr+Y/2) \leq 1.5$, and more preferably $0.818 \leq Ce/Zr \leq 1.222$ and $0.818 \leq (Ce+lanthanoide (excluding Ce)+Y/2)/(Zr+Y/2) \leq 1.222$. If the content molar ratios of Ce, Zr and the additional element are out of the above-described ranges, the intensity ratio ($I_{ord}/I_{max}$) of the X-ray diffraction peaks, which is an indicator for the ratio of presence of the ordered phase, tends to decrease.

Note that it is not necessarily certain why the oxygen storage/release material of the present invention exhibits the excellent heat resistance when the ceria-zirconia composite oxide porous body according to the present invention contains the additional element. The present inventors have surmised as follows. Specifically, in the ceria-zirconia composite oxide porous body according to the present invention, the pyrochlore phase is formed under a reduction atmosphere. At this time, since oxygen defects are formed inside of lattices formed by $Ce^{3+}$, the oxygen storage/release material of the present invention exhibits the excellent oxygen storage/release performance. The same applies to the ceria-zirconia composite oxide porous body containing the additional element. In the ceria-zirconia composite oxide porous body in which the additional element is contained (preferably solid-dissolves) in the Ce site and/or the Zr site (especially, the lanthanoide solid-dissolves in the Ce site and Y solid-dissolves in the Zr site), since oxygen defects are formed inside of lattices formed by the Ce sites containing the additional element when the pyrochlore phase is formed under a reduction atmosphere, the oxygen storage/release material of the present invention exhibits the excellent oxygen storage/release performance. Meanwhile, even when the Ce site and the Zr site containing the additional element are exposed under a high temperature oxidation atmosphere of, for example about 1000° C., the sites stably stay in each lattice position. As a result, since the structure of the ordered phase is stably maintained, it can be assumed that the oxygen defects inside of the lattices formed by the Ce sites containing the additional element also exist stably. Accordingly, it can be assumed that the oxygen storage/release material of the present invention exhibits the excellent heat resistance, whereby exhibits the excellent oxygen storage/release performance even when exposed to high temperature.

Such a ceria-zirconia composite oxide porous body according to the present invention can be prepared as described below, for example. Specifically, carbon or the like is first added as a mold to a solution containing a ceria-zirconia composite oxide precursor (for example, a colloid solution of a metal compound containing Ce and Zr, and if necessary, at least one additional element selected from the group consisting of Y and lanthanoides excluding Ce) as necessary, followed by a drying process (for example, spray dry) or the like to remove a solvent. The resultant is further subjected to an oxidation process or the like as necessary to remove carbon, preparing a ceria-zirconia composite oxide porous body. At this time, it is possible to obtain ceria-zirconia composite oxide porous bodies having various central pore diameters and various pore volume concentration ratios by adjusting the pH of the solution containing the ceria-zirconia composite oxide precursor, or as necessary, the amount and size or distribution of the size of carbon or the like added as a mold. Thereafter, this ceria-zirconia composite oxide porous body is subjected to a reduction process at a temperature of 700° C. or more (preferably, 900° C. or more), followed by an additional oxidation process or the like, and as a result, a ceria-zirconia composite oxide porous body having at least one ordered phase of the pyrochlore phase and the κ phase can be obtained. A reducing gas used for the above-described reduction process is not particularly limited, but includes, for example, carbon monoxide (CO), hydrocarbon (HC), hydrogen ($H_2$), a nitrogen atmosphere containing carbon (C) or the like in order to eliminate the influence of oxygen.

In addition, the method for the above-described oxidation process is not particularly limited, but includes, for example, a method including heating the ceria-zirconia composite oxide having the ordered phase under an oxidation atmosphere containing oxygen (for example, in the air). Moreover, the heating temperature for such oxidation process is not particularly limited, but is preferably approximately 300 to 1000° C. Further, the heating time for the above-described reduction process and oxidation process is also not particularly limited, but is preferably approximately 0.5 to 10 hours.

Next, a catalyst for purification of exhaust gas of the present invention is described. The catalyst for purification of exhaust gas of the present invention contains the above-described oxygen storage/release material of the present invention. In the catalyst for purification of exhaust gas of the present invention, the oxygen storage/release material may be contained as a mixture with a conventionally known catalyst for purification of exhaust gas, or may be contained as a support for a conventionally known catalytic component such as a noble metal. Such a catalyst for purification of exhaust gas of the present invention is excellent in response to changes in exhaust gas flow rate and temperature due to the excellent oxygen utilization efficiency of $CeO_2$ and oxygen release rate (OSC-r) of the above-described oxygen storage/release material, and thus serves as a catalyst excellent in performance of removing NOx and unburned components of a fuel in an exhaust gas.

EXAMPLES

Hereinafter, the present invention is described in further detail based on Examples and Comparative Examples; however, the present invention is not limited to Examples described below.

Example 1

First, 39.06 g of ceric ammonium nitrate (manufactured by Wako Pure Chemical Industries, Ltd., JIS Special Grade) and 21.05 g of zirconium oxynitrate dihydrate (manufactured by Wako Pure Chemical Industries, Ltd., Wako 1st Grade) were dissolved into 250 g of an ion exchanged water to prepare a raw material solution A. In addition, 0.1 g of polyethyleneimine having an average molecular weight of 10000 (manufactured by Wako Pure Chemical Industries, Ltd.) was dissolved into 270 g of an ion exchanged water, and further 14 droplets of ethylenediamine (manufactured by Wako Pure Chemical Industries, Ltd., Wako Special Grade) was added thereto with a dropping pipette to prepare a raw material solution B. At this time, ethylenediamine was added to the raw material solution B by driblets such that the pH of a solution obtained by mixing the raw material solution A and the raw material solution B each in 2 ml became 2.6.

Next, a device for producing ultrafine particles (a super agitation reactor) described in Japanese Patent Application Publication No. 2014-24058 was used to prepare a nanocolloid solution of a metal compound by feeding and mixing the raw material solution A and the raw material solution B each at a feed rate of 5 ml/min while rotating the rotor at a rotation speed of 8000 rpm. The pH of this nanocolloid solution of the metal compound was 2.4.

To 400 ml of this nanocolloid solution of the metal compound, 125 ml of a 5% by mass carbon-dispersed aqueous solution (a water dispersion liquid of carbon obtained by pulverizing a bulk carbon black manufactured by Tokai Carbon Co., Ltd. with a stone mill, and further mixing water therewith such that the amount of carbon corresponds to 5% by mass, followed by pulverizing with a bead mill and preparing such that the average particle diameter became 0.1 μm using a laser diffraction-scattering particle size distribution measurement device "Microtrac MT-3000" manufactured by Nikkiso Co., Ltd.) was added, and then spray dry was carried out under the conditions of pump output: 15% (feed rate of the solution: about 4.5 ml/min), aspirator output: 100%, inlet temperature: 150° C., and air spray flow rate: about 7.8 L/min, using the Mini Spray Dryer "B-290" (nozzle diameter: 1.4 μm) manufactured by Nihon BUCHI K.K. to obtain a dried powder.

This dried powder was washed with water and collected by filtration, followed by drying at 110° C. and further heating for 5 hours at 600° C. under an oxygen-containing gas ($O_2$: 2% and the balance: $N_2$) atmosphere to remove carbon. Thereafter, reduction firing was carried out for 5 hours at 1000° C. under an atmosphere of a mixed gas of hydrogen and nitrogen ($H_2$:$N_2$=3%:97%), followed by further firing for 1 hour at 600° C. in the air to obtain a ceria-zirconia composite oxide porous body (oxygen storage/release material). The molar ratio of Ce and Zr in this oxygen storage/release material was Ce:Zr=47.5:52.5 in terms of charged molar ratio.

Example 2

First, 35.08 g of ceric ammonium nitrate (manufactured by Wako Pure Chemical Industries, Ltd., JIS Special Grade) and 24.21 g of zirconium oxychloride octahydrate (manufactured by Wako Pure Chemical Industries, Ltd., Wako Special Grade) were dissolved into 420 g of an ion exchanged water to prepare a raw material solution A. In addition, 0.1 g of polyethyleneimine having an average molecular weight of 10000 (manufactured by Wako Pure Chemical Industries, Ltd.) was dissolved into 470 g of an ion exchanged water, and further about 20 ml of ethylenediamine (manufactured by Wako Pure Chemical Industries, Ltd., Wako Special Grade) was added thereto to prepare a raw material solution B. At this time, the pH of a solution obtained by mixing the raw material solution A and the raw material solution B each in 2 ml was 8.75.

Next, the raw material solution A and the raw material solution B were mixed to prepare a nanocolloid solution of a metal compound in the same manner as that in Example 1 except that the rotation speed of the rotor was changed to 3400 rpm. The pH of this nanocolloid solution of the metal compound was 8.8. Thereafter, spray dry was carried out to obtain a dried powder in the same manner as that in Example 1 except that 90 ml of the same carbon-dispersed aqueous solution as that used in Example 1 was added to 300 ml of this nanocolloid solution of the metal compound.

This dried powder was washed with water and collected by filtration, followed by drying at 110° C. and further heating for 3 hours at 400° C. in the air, and thereafter heating for 5 hours at 600° C. under an atmosphere of a mixed gas of oxygen and nitrogen ($O_2$/$N_2$=2%/98%) to remove carbon. Thereafter, reduction firing and firing in the air were carried out in the same manner as that in Example 1 to obtain a ceria-zirconia composite oxide porous body (oxygen storage/release material). The molar ratio of Ce and Zr in this oxygen storage/release material was Ce:Zr=46:54 in terms of charged molar ratio.

Example 3

A dried powder was obtained in the same manner as that in Example 2 except that no carbon-dispersed aqueous solution was added. This dried powder was dried at 110° C. and further heated for 3 hours at 400° C. in the air, followed by reduction firing and firing in the air in the same manner as that in Example 1 to obtain a ceria-zirconia composite oxide porous body (oxygen storage/release material). The molar ratio of Ce and Zr in this oxygen storage/release material was Ce:Zr=46:54 in terms of charged molar ratio.

Comparative Example 1

First, 87.72 g of ceric ammonium nitrate (manufactured by Wako Pure Chemical Industries, Ltd., JIS Special Grade) and 60.53 g of zirconium oxychloride octahydrate (manufactured by Wako Pure Chemical Industries, Ltd., Wako Special Grade) were dissolved into 1100 g of an ion exchanged water to prepare a raw material solution A. In addition, 0.25 g of polyethyleneimine having an average molecular weight of 10000 (manufactured by Wako Pure Chemical Industries, Ltd.) was dissolved into 120 g of an ion exchanged water and further about 29 ml of ethylenediamine (manufactured by Wako Pure Chemical Industries, Ltd., Wako Special Grade) was added thereto to prepare a raw material solution B. At this time, the pH of a solution obtained by mixing the raw material solution A and the raw material solution B each in 2 ml was 2.1.

Next, the raw material solution A and the raw material solution B were mixed to prepare a nanocolloid solution of a metal compound in the same manner as that in Example 2.

The pH of this nanocolloid solution of the metal compound was 2.5. Thereafter, a carbon-dispersed aqueous solution was added in the same proportion as that in Example 2 and spray dry was carried out in the same manner as that in Example 2 to obtain a dried powder.

This dried powder was subjected to water washing, collection by filtration, drying, removal of carbon, reduction firing, and firing in the air in the same manner as that in Example 2 to obtain a ceria-zirconia composite oxide porous body (oxygen storage/release material). The molar ratio of Ce and Zr in this oxygen storage/release material was Ce:Zr=46:54 in terms of charged molar ratio.

Comparative Example 2

A dried powder was obtained in the same manner as that in Comparative Example 1 except that no carbon-dispersed aqueous solution was added. This dried powder was dried at 110° C. and further heated for 3 hours at 400° C. in the air, followed by reduction firing and firing in the air in the same manner as that in Example 1 to obtain a ceria-zirconia composite oxide porous body (oxygen storage/release material). The molar ratio of Ce and Zr in this oxygen storage/release material was Ce:Zr=46:54 in terms of charged molar ratio.

Example 4

First, 83.68 g of ceric ammonium nitrate (manufactured by Wako Pure Chemical Industries, Ltd., JIS Special Grade), 52.74 g of zirconium oxychloride octahydrate (manufactured by Wako Pure Chemical Industries, Ltd., Wako Special Grade), 6.38 g of praseodymium nitrate heptahydrate (manufactured by Mitsuwa Chemicals Co., Ltd., Special Grade), and 6.71 g of yttrium chloride hexahydrate (manufactured by Mitsuwa Chemicals Co., Ltd.) were dissolved into 1000 g of an ion exchanged water to prepare a raw material solution A. In addition, 0.25 g of polyethyleneimine having an average molecular weight of 10000 (manufactured by Wako Pure Chemical Industries, Ltd.) was dissolved into 1200 g of an ion exchanged water, and further 60 g of ethylenediamine (manufactured by Wako Pure Chemical Industries, Ltd., Wako Special Grade) was added thereto to prepare a raw material solution B. At this time, the pH of a solution obtained by mixing the raw material solution A and the raw material solution B each in 2 ml was 8.4.

Next, the raw material solution A and the raw material solution B were mixed to prepare a nanocolloid solution of a metal compound in the same manner as that in Example 1 except that the rotation speed of the rotor was changed to 5000 rpm. The pH of this nanocolloid solution of the metal compound was 8.4. Thereafter, spray dry was carried out to obtain a dried powder in the same manner as that in Example 1 except that 6.2 g of the same carbon-dispersed aqueous solution as that used in Example 1 was added to 400 ml of this nanocolloid solution of the metal compound, and the pump output was changed to 20% (the feed rate of the solution: about 6.0 ml/min).

This dried powder was washed with water and collected by filtration, followed by drying for 2.5 hours at 150° C. and further heating for 5 hours at 400° C. after rising a temperature at 50° C./hour. Furthermore, heating was carried out for 5 hours at 600° C. in a tubular furnace in which the air flowed at 1 L/min to remove carbon. Thereafter, reduction firing was carried out for 10 hours at 1000° C. in a tubular furnace in which a mixed gas of hydrogen and nitrogen ($H_2$: 30 ml/min and $N_2$: 970 ml/min) flowed, followed by further firing for 30 min at 600° C. in a tubular furnace in which the air flowed at 1 L/min to obtain a quaternary ceria-zirconia composite oxide porous body (oxygen storage/release material) containing praseodymium and yttrium. The molar ratio of Ce, Zr, Pr and Y in this oxygen storage/release material were Ce:Zr:Pr:Y=42.18:47.13:4.26:6.43 in terms of charged molar ratio, Ce/Zr=0.895 and (Ce+Pr+Y)/Zr=1.122, and (Ce+Pr+Y/2)/(Zr+Y/2)=0.986.

Example 5

To 400 ml of a nanocolloid solution of a metal compound prepared in the same manner as that in Example 4, 400 ml of an ion exchanged water was added to dilute the nanocolloid solution two times in terms of a volume. Spray dry was carried out to obtain a dried powder in the same manner as that in Example 1 except that the 2-fold diluted nanocolloid solution was used. This dried powder was subjected to water washing, collection by filtration, drying, heating, reduction firing, and firing in an air flow in the same manner as that in Example 4 to obtain a quaternary ceria-zirconia composite oxide porous body (oxygen storage/release material) containing praseodymium and yttrium. The molar ratio of Ce, Zr, Pr and Y in this oxygen storage/release material were Ce:Zr:Pr:Y=42.18:47.13:4.26:6.43 in terms of charged molar ratio, Ce/Zr=0.895 and (Ce+Pr+Y)/Zr=1.122, and (Ce+Pr+Y/2)/(Zr+Y/2)=0.986.

<Measurement of Central Pore Diameter and Cumulative Pore Volume>

About 3 g of each of the oxygen storage/release materials obtained in Examples and Comparative Examples was put into a bag for vacuum packaging ("KN-201" manufactured by ASAHI KASEI PAX CORPORATION), and then was encapsulated by degassing for 15 seconds using a table tap vacuum packaging machine ("V-380GF" manufactured by TOSEI CORPORATION). This oxygen storage/release material was powder-compacted at a pressure of 1000 kg/cm$^2$ using a cold isostatic press (manufactured by NIKKISO CO., LTD.). The obtained powder-compacted product was pulverized to adjust a particle diameter of 0.5 to 2 mm. Thus, a sample for measurement was prepared. A log differential pore volume distribution of each of the samples for measurement (about 0.3 g) was obtained with a mercury porosimeter ("PoreMaster 60GT" manufactured by Quantachrome Instruments Japan G.K.) using contact angle: 130 degrees, surface tension: 485 mN/m, and density: 13.5335 g/ml as mercury parameters. The results are shown in FIGS. 1 and 2.

Figure 1:
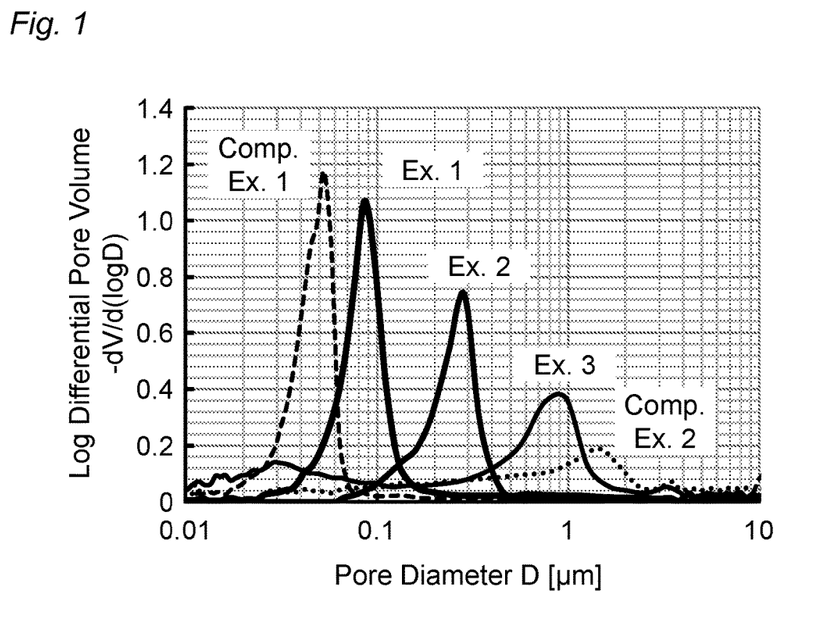
FIG. 1 is a graph showing log differential pore volume distributions of oxygen storage/release materials obtained in Examples 1 to 3 and Comparative Examples 1 and 2.
Figure 2:
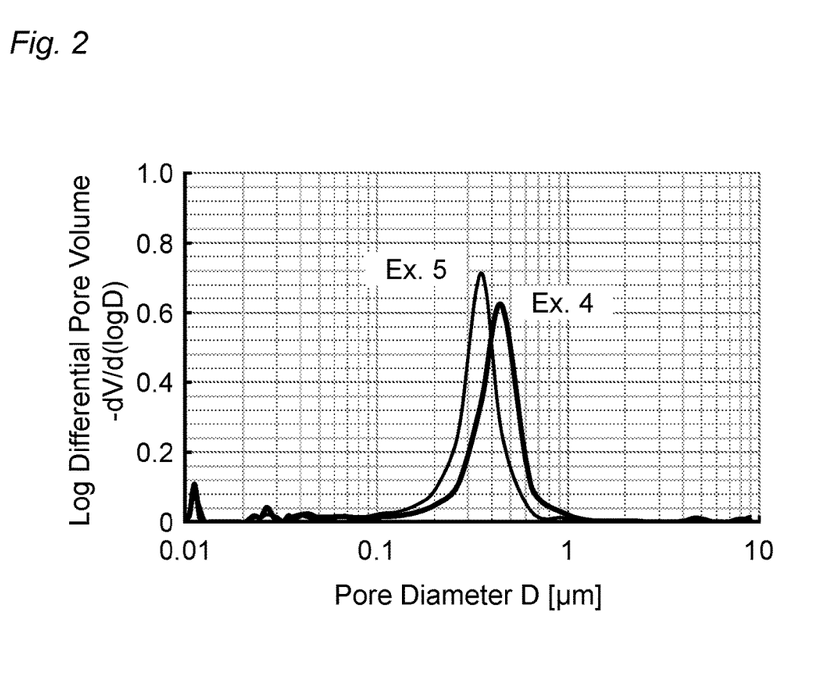
FIG. 2 is a graph showing log differential pore volume distributions of oxygen storage/release materials obtained in Examples 4 and 5.

Based on the results shown in FIGS. 1 and 2, a central pore diameter (a pore diameter of the maximum peak in the log differential pore volume distribution) Dc of each oxygen storage/release material was determined. The results are shown in Tables 1 and 2. In addition, based on the results shown in FIGS. 1 and 2, a cumulative pore volume of pores each having a pore diameter in the range of 0.5 times to 2 times (0.5 Dc to 2 Dc) the central pore diameter and a cumulative pore volume of pores each having a pore diameter in the range of 10 nm to 10 μm were determined. The ratio of the former cumulative pore volume to the latter cumulative pore volume (pore volume concentration ratio) was calculated. These results are shown in Tables 1 and 2. Note that the pore volume of a pore diameter for which no measurement point existed was determined by linear approximation of adjacent two measurement points in the log differential pore volume distribution curve.

<X-Ray Diffraction Measurement>

Figure 3:
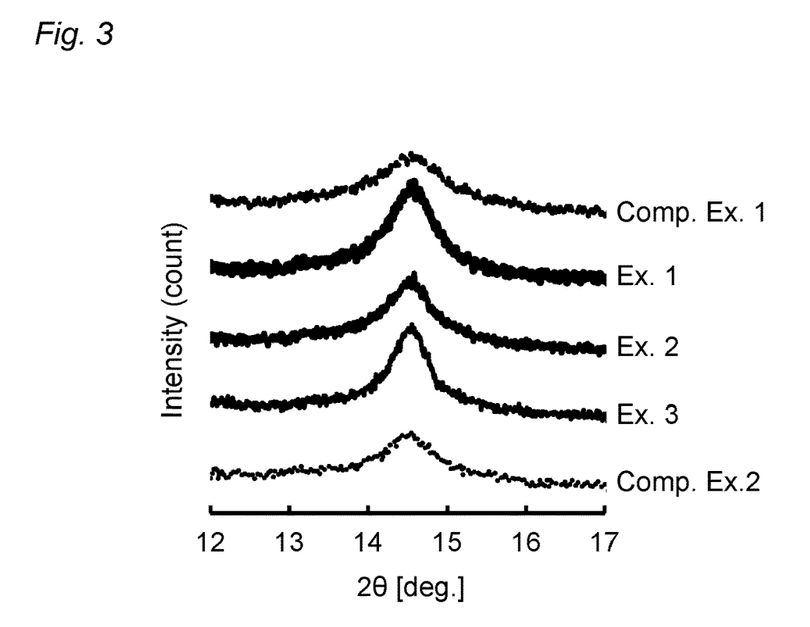
FIG. 3 is a graph showing X-ray diffraction patterns of the oxygen storage/release materials obtained in Examples 1 to 3 and Comparative Examples 1 and 2 in 2θ≈12 to 17 deg.
Figure 4:
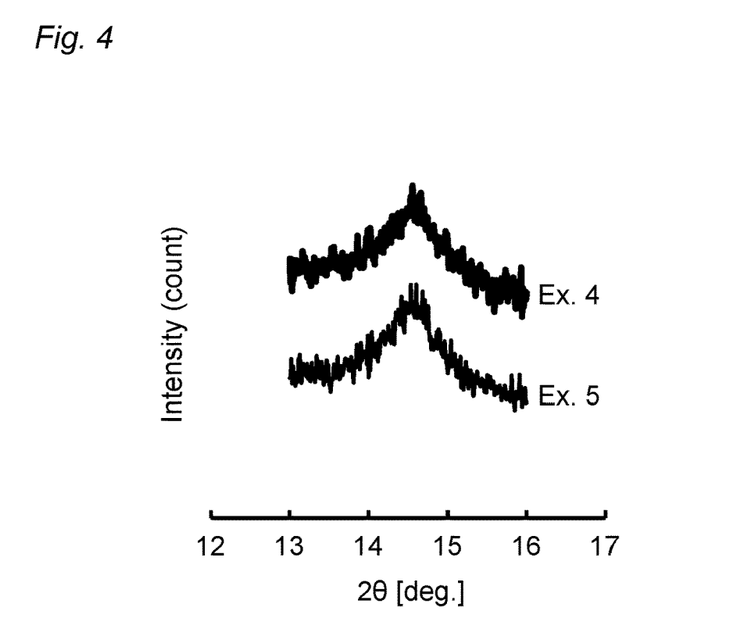
FIG. 4 is a graph showing X-ray diffraction patterns of the oxygen storage/release materials obtained in Examples 4 and 5 in 2θ≈13 to 16 deg.
Figure 5:
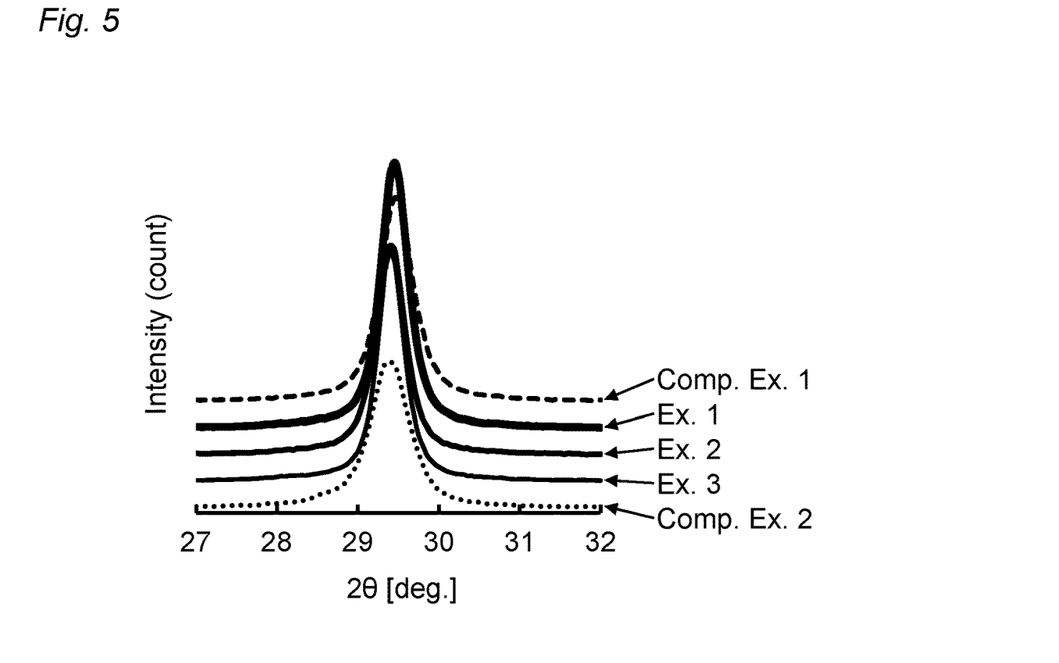
FIG. 5 is a graph showing X-ray diffraction patterns of the oxygen storage/release materials obtained in Examples 1 to 3 and Comparative Examples 1 and 2 in 2θ≈27 to 32 deg.
Figure 6:
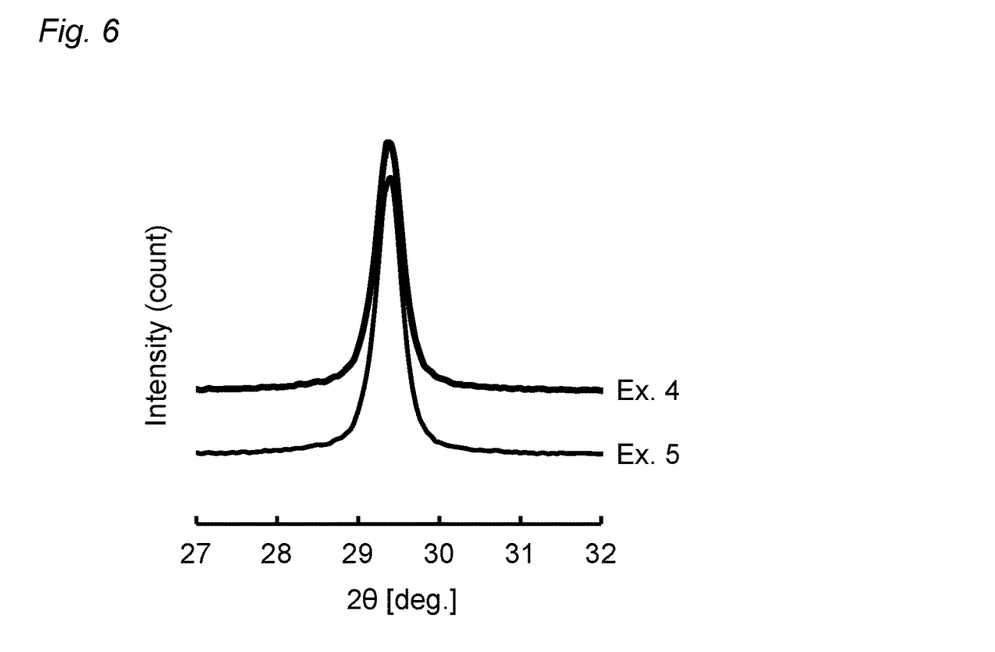
FIG. 6 is a graph showing X-ray diffraction patterns of the oxygen storage/release materials obtained in Examples 4 and 5 in 2θ≈27 to 32 deg.

The X-ray diffraction pattern of each of the oxygen storage/release materials obtained in Examples and Comparative Examples was measured under conditions of tube voltage: 40 kV and current: 40 mA, by using a multipurpose horizontal sample mount X-ray diffraction system ("Ultima IV" manufactured by Rigaku Corporation) with CuKα as an X-ray source. Note that when the measurement range was 2θ≈12 to 17 deg or 13 to 16 deg, the measurement was carried out with setting of (condition 1) scanning speed: 1 deg/min and sampling width: 0.01 deg, while when the measurement range was 2θ≈10 to 65 deg, the measurement was carried out with setting of (condition 2) scanning speed: 10 deg/min and sampling width: 0.05 deg. FIGS. 3 and 4 shows X-ray diffraction patterns in 2θ≈12 to 17 deg or 13 to 16 deg measured under (condition 1). FIGS. 5 and 6 shows X-ray diffraction patterns in 2θ≈27 to 32 deg measured under (condition 2). The peak in the region of 2θ=14 to 15 deg shown in FIGS. 3 and 4 is a peak derived from the ordered phase (pyrochlore phase, κ phase) while the peak in the region of 2θ=29 to 30 deg shown in FIGS. 5 and 6 is a maximum peak.

In addition, based on the results measured under (condition 2), the intensity $I_{ord}$ of the peak derived from the ordered phase and the intensity $I_{max}$ of the maximum peak were determined, and a ratio of these ($I_{ord}/I_{max}$) was calculated. The results are shown in Tables 1 and 2.

$Nd_2O_3$=30% by mass:60% by mass:4% by mass:4% by mass:2% by mass), followed by firing at 500° C. in the air to obtain a Rh-supported $Al_2O_3$—$ZrO_2$—$La_2O_3$—$Y_2O_3$—$Nd_2O_3$ composite oxide (amount of Rh supported: 0.2% by mass). This Rh-supported $Al_2O_3$—$ZrO_2$—$La_2O_3$—$Y_2O_3$—$Nd_2O_3$ composite oxide and each of the oxygen storage/release materials obtained in Examples and Comparative Examples were powder-mixed in a mass ratio of 1:1 using a mortar, and a mixture thus obtained was powder-compacted. A compact thus obtained was then pulverized and classified to prepare a pellet catalyst having a particle diameter of 0.5 to 1 mm.

<Measurement of Oxygen Release Rate (OSC-r)>

0.5 g of each pellet catalyst was filled in a reaction tube, which was then set in a fixed-bed flow reactor (manufactured by Best Instruments Co., Ltd.). Under conditions of a measurement temperature of 400° C. or 600° C. and a gas flow rate of 10 L/min, this pellet catalyst was fed with a lean gas ($O_2$: 1% and the balance: $N_2$) for 3 minutes, was then fed with a nitrogen gas for 1 minutes, and was further fed with a rich gas (CO: 2% and the balance: $N_2$) for 3 minutes. During feeding the rich gas, the $CO_2$ concentration in the gas emitted from the catalyst was measured. As a result, when

TABLE 1

| | Central Pore Diameter | | Cumulative Pore Volume [ml/g] | | Pore Volume Concentration Ratio | Peak Intensity Ratio |
|---|---|---|---|---|---|---|
| | Dc [nm] | 0.5Dc to 2Dc | 0.5Dc~2Dc | 10 nm~10 µm | [%] | $I_{ord}/I_{max}$ |
| Comp. Ex. 1 | 53 | 26.5 nm to 106 nm | 0.246 | 0.285 | 86.3 | 0.051 |
| Ex. 1 | 86 | 43.0 nm to 172 nm | 0.248 | 0.286 | 86.7 | 0.048 |
| Ex. 2 | 287 | 143.5 nm to 574 nm | 0.179 | 0.226 | 79.2 | 0.052 |
| Ex. 3 | 977 | 488.5 nm to 1.95 µm | 0.130 | 0.298 | 43.6 | 0.052 |
| Comp. Ex. 2 | 1450 | 725 nm to 2.9 µm | 0.070 | 0.192 | 36.5 | 0.063 |

TABLE 2

| | Central Pore Diameter | | Cumulative Pore Volume [ml/g] | | Pore Volume Concentration Ratio | Peak Intensity Ratio |
|---|---|---|---|---|---|---|
| | Dc [nm] | 0.5Dc to 2Dc | 0.5Dc~2Dc | 10 nm~10 µm | [%] | $I_{ord}/I_{max}$ |
| Ex. 4 | 452 | 226 nm to 904 nm | 0.136 | 0.174 | 78.2 | 0.049 |
| Ex. 5 | 352 | 176 nm to 704 nm | 0.152 | 0.180 | 84.7 | 0.045 |

As shown in Tables 1 and 2, it was confirmed that it was possible to obtain oxygen storage/release materials having various central pore diameters and various pore volume concentration ratios by adjusting the pH of the nanocolloid solution of the metal compound and the amount of carbon added. In addition, it was confirmed that oxygen storage/release materials having a prescribed central pore diameter and a prescribed pore volume concentration ratio were obtained even when the ceria-zirconia composite oxide porous body contained yttrium and the lanthanoide.

(Preparation of Catalyst)

10% by mass of a rhodium nitrate solution was diluted and impregnated in an $Al_2O_3$—$ZrO_2$—$La_2O_3$—$Y_2O_3$—$Nd_2O_3$ composite oxide support ($Al_2O_3$:$ZrO_2$:$La_2O_3$:$Y_2O_3$:

the rich gas was fed for 3 minutes at a temperature of 600° C., the $CO_2$ concentration after 3 minutes was substantially zero and the integrated amount of $CO_2$ was substantially a theoretical value in all the pellet catalysts of Examples 1 to 3. From this, it was confirmed that the oxygen utilization efficiency of $CeO_2$ was high.

In addition, from the integrated amount of $CO_2$ detected for 5 seconds from the start of feeding the rich gas, the amount of oxygen consumed per second was calculated, and from this value, the amount of oxygen released per g of the oxygen storage/release material, that is, the oxygen release rate (OSC-r) was determined. The results are shown in Table 3 and FIG. 7.

TABLE 3

| | Central Pore Diameter Dc [nm] | Pore Volume Concentration Ratio [%] | Peak Intensity Ratio $I_{ord}/I_{max}$ | OSC-r [(μmol-$O_2$/g-CZ)/sec] 400° C. | OSC-r [(μmol-$O_2$/g-CZ)/sec] 600° C. |
|---|---|---|---|---|---|
| Comp. Ex. 1 | 53 | 86.3 | 0.051 | 25.6 | 62.2 |
| Ex. 1 | 86 | 86.7 | 0.048 | 46.2 | 67.0 |
| Ex. 2 | 287 | 79.2 | 0.052 | — | 78.2 |
| Ex. 3 | 977 | 43.6 | 0.052 | — | 78.0 |
| Comp. Ex. 2 | 1450 | 36.5 | 0.063 | — | 52.6 |

Figure 7:
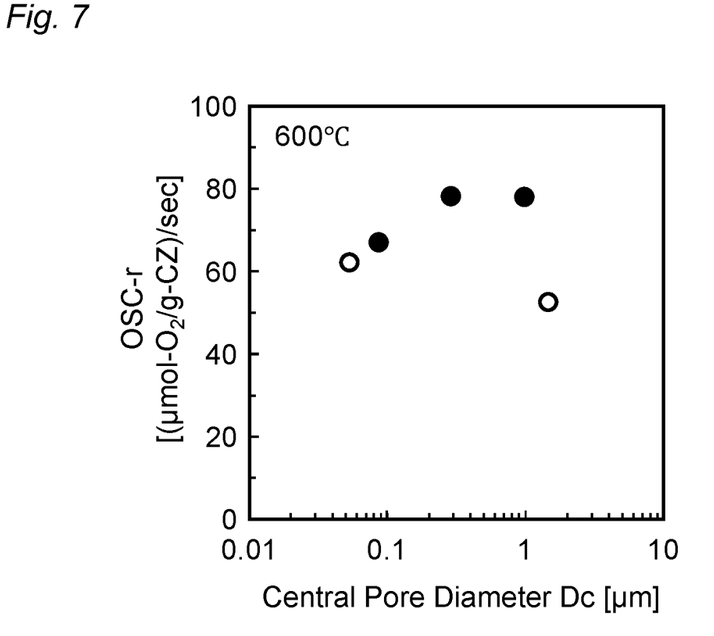
FIG. 7 is a graph showing a relationship between a central pore diameter of an oxygen storage/release material and an oxygen release rate of a catalyst for purification of exhaust gas.

As shown in Table 3 and FIG. 7, the pellet catalysts containing the oxygen storage/release materials (Examples 1 to 3) of the present invention which has predetermined central pore diameter and pore volume concentration ratio had higher oxygen release rate (OSC-r) than the pellet catalysts containing the oxygen storage/release materials obtained in Comparative Examples 1 and 2, and were thus confirmed to be excellent oxygen storage/release materials.

As described so far, the present invention makes it possible to obtain an oxygen storage/release material that has a high oxygen utilization efficiency of $CeO_2$ and exhibits an excellent oxygen release rate. The oxygen storage/release material of the present invention is therefore useful as a support, a promoter, and the like for a catalyst for purification of exhaust gas for removing NOx and unburned components of a fuel contained in a gas emitted from an internal combustion engine such as an automotive engine.

What is claimed is:

1. An oxygen storage/release material comprising:
a ceria-zirconia composite oxide porous body that has at least one ordered phase of a pyrochlore phase and a κ phase, and that has a central pore diameter of 70 nm to 1 μm as measured by a mercury penetration method, and in which a cumulative pore volume of pores that each have a pore diameter in the range of 0.5 times to 2 times the central pore diameter is 40% or more of the cumulative pore volume of pores that each have a pore diameter in the range of 10 nm to 10 μm as measured by the mercury penetration method.

2. The oxygen storage/release material according to claim 1, wherein
in an X-ray diffraction pattern of the ceria-zirconia composite oxide porous body obtained by an X-ray diffraction measurement using CuKα, a ratio ($I_{ord}/I_{max}$) between a intensity $I_{ord}$ of a peak derived from the ordered phase in a region of 2θ=14 to 15 deg and a intensity $I_{max}$ of a maximum peak in a region of 2θ=29 to 30 deg is 0.03 or more.

3. The oxygen storage/release material according to claim 1, wherein
a content molar ratio of Ce and Zr in the ceria-zirconia composite oxide porous body is Ce:Zr=40:60 to 60:40.

4. The oxygen storage/release material according to claim 1, wherein
the ceria-zirconia composite oxide porous body further comprises at least one additional element selected from the group consisting of Y and lanthanoides excluding Ce.

5. The oxygen storage/release material according to claim 4, wherein
the additional element is at least one selected from the group consisting of La, Pr, Nd and Y.

6. The oxygen storage/release material according to claim 4, wherein
a content molar ratios of Ce, Zr and the additional element in the ceria-zirconia composite oxide porous body are $0.667 \leq Ce/Zr \leq 1.5$ and $0.667 \leq (Ce+M)/Zr \leq 1.5$ (in the formula, M represents the additional element).

7. A catalyst for purification of exhaust gas comprising:
the oxygen storage/release material according to claim 1.

8. The oxygen storage/release material according to claim 1, wherein
the central pore diameter is 200 nm to 1 μm.

* * * * *